US010387261B2

(12) United States Patent
Debata et al.

(10) Patent No.: US 10,387,261 B2
(45) Date of Patent: Aug. 20, 2019

(54) SYSTEM AND METHOD TO CAPTURE STORED DATA FOLLOWING SYSTEM CRASH

(71) Applicant: Dell Products L.P., Round Rock, TX (US)

(72) Inventors: Smruti Ranjan Debata, Bangalore (IN); K. N. Ravishankar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 15/587,904

(22) Filed: May 5, 2017

(65) Prior Publication Data
US 2018/0322016 A1 Nov. 8, 2018

(51) Int. Cl.
G06F 11/14 (2006.01)
G06F 11/07 (2006.01)
(52) U.S. Cl.
CPC ...... *G06F 11/1441* (2013.01); *G06F 11/0757* (2013.01); *G06F 2201/86* (2013.01)
(58) Field of Classification Search
CPC .......................... G06F 11/14; G06F 11/1441
USPC .......................................................... 714/23
See application file for complete search history.

(56) References Cited

U.S. PATENT DOCUMENTS

| 5,038,319 | A | * | 8/1991 | Carter | .................... | G03G 15/50 |
| | | | | | | 714/2 |
| 5,138,377 | A | * | 8/1992 | Smith | .................... | G03G 15/55 |
| | | | | | | 399/11 |
| 2002/0099486 | A1 | * | 7/2002 | Nagao | ................... | B60R 21/013 |
| | | | | | | 701/45 |
| 2003/0226059 | A1 | * | 12/2003 | Braun | ................. | G06F 11/0748 |
| | | | | | | 714/20 |
| 2007/0101191 | A1 | * | 5/2007 | Iwama | ................ | G06F 11/0712 |
| | | | | | | 714/15 |
| 2011/0137874 | A1 | * | 6/2011 | Grosman | .......... | G06F 17/30353 |
| | | | | | | 707/688 |
| 2013/0212436 | A1 | * | 8/2013 | Zhu | ...................... | G06F 11/0772 |
| | | | | | | 714/35 |
| 2015/0370655 | A1 | * | 12/2015 | Tucek | ................... | G06F 3/0619 |
| | | | | | | 714/15 |
| 2016/0139995 | A1 | * | 5/2016 | Takami | ............... | G06F 11/0706 |
| | | | | | | 714/23 |
| 2017/0031769 | A1 | * | 2/2017 | Zheng | ................. | G06F 11/1446 |

* cited by examiner

*Primary Examiner* — Kamini B Patel
(74) *Attorney, Agent, or Firm* — Jackson Walker L.L.P.

(57) ABSTRACT

A method and system respond to a system reset by executing a BIOS that establishes pre-OS communication with a baseboard management controller (BMC) and determines the state of a flag maintained by the BMC. The flag indicates whether the system reset was part of a crash event or a controlled shutdown. If the flag indicated a crash event, contents of the server cache are copied to a persistent secondary memory. The content of the secondary memory may then be sent to a management resource and/or to a remote management system. Before booting to an operating system and resuming normal operation, the flag may be SET. When a subsequent system resent occurs, the flag is cleared if the system reset is part of a controlled shutdown. Otherwise, the flag will remain set to indicate the crash event when the boot sequence is initiated.

19 Claims, 2 Drawing Sheets

SYSTEM AND METHOD TO CAPTURE STORED DATA FOLLOWING SYSTEM CRASH

TECHNICAL FIELD

The present disclosure generally pertains to information handling systems and more particularly, recovering from disruptions in system function.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling system's may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

In the context of a datacenter or a similar environment, information handling systems, including enterprise class servers, may occasionally and unexpectedly "hang," or "crash." As used in this disclosure, "hang" refers to a state, often detected by a management resource function generally referred to as a watchdog timer, in which the system is substantially or entirely non-responsive to keyboard and other conventional inputs. If a watchdog timeout event occurs, the management resource may execute a system reset that overwrites volatile memory.

For purposes of this disclosure, a system reset refers to an operation that re-initializes the core hardware components of the system and boots the system to fully initialize the system and restart the operating system. While a system reset will most likely return the information handling system to a functional operational state, system reset will also most likely result in the permanent loss of any uncommitted data.

As used in this disclosure, "crash" refers specifically to an unanticipated and unintended soft-reset, during which power is present.

Because a system that hangs is substantially inoperative, it is desirable to identify and resolve hanged systems quickly and automatically. However, a hanged system may have a considerable amount of uncommitted data, i.e., data that has not been saved to system memory or to any type of persistent mass storage.

SUMMARY

Resource lockups that can result in a hang include, as non-limiting examples, CPU-core to CPU-core(C2C) lockups, CPU-core to GPU-core (C2G) lockups, CPU-core to peripheral device lockups (C2P), and disk and memory (D&M) lockups including disk read/write errors, out-of-memory errors caused by memory intensive rogue processes, and so forth. A resource lockup may result in an asynchronous system reset, also referred to herein as a crash, corresponding to a watchdog timeout event when a lockup results in the absence of a specific system activity throughout an interval of time that exceeds a particular threshold. Whether asynchronous or not, a system reset may include or produce an operating system restart that overwrites system memory (DRAM) even though the system memory contents might provide insight into the origin of the problem.

Disclosed subject matter addresses the need for capturing system memory contents following an asynchronous system reset. In at least one embodiment, a management resource resident on the system, e.g., a service processor, management controller, baseboard management controller, remote access controller, integrated remote access controller, or the like, is configured to maintain information indicative of a type associated with the most recent system reset that occurred. This information may be in the form of a stored value that is SET to indicate an asynchronous system reset and cleared to indicate a normal or synchronous reset so that, when a system reset is triggered asynchronously, at least some portions of system memory, referred to herein as the server cache, may be stored into a persistent storage resource including, as examples, a non-volatile dual inline memory module (NVDIMM), a solid state drive (SSD), and/or a hard disk drive (HDD). In the case of an NVDIMM, the system memory may be implemented with NVDIMM devices and the secondary memory in such cases is the nonvolatile storage components of the NVDIMM devices. In any such embodiments, copying the server cache to the secondary memory may include invoking an NVDIMM save operation supported by the NVDIMM device. As an example, the NVDIMM may include a pin that, when asserted, transitions the NVDIMM into an asynchronous DRAM refresh (ADR) state that preserves the DRAM contents indefinitely as long as power is maintained. Once in the ADR state, the transfer of DRAM contents to the corresponding non-volatile storage may be achieved by asserting a Save pin or a functional equivalent thereof. Other methods of copying DRAM memory to flash or other nonvolatile storage in an NVDIMM may be supported as well.

Accordingly, a disclosed method and system respond to a system reset by executing a BIOS that checks a flag indicative of whether the reset resulted from a controlled shut down of an information handling system. Responsive to determining that the flag is set, contents of a cache memory are copied to a secondary memory. The content of the secondary memory may then be sent to a management resource and/or to a remote management system. The flag may be a flag located on and maintained by the management resource and the flag may be checked by a BIOS executing on the information handling system. If the flag is clear when the BIOS checks it, the BIOS may set the flag before loading an operating system and transitioning to a normal operating state. Following the next subsequent system reset, the system may clear the flag if the reset was a controlled shutdown executed by the operating system.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

In the following detailed description of exemplary embodiments, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device, and/or parameter names and/or corresponding acronyms thereof, such as those of the executing utility, logic, and/or firmware (F/W) described herein, are for example only and not meant to imply any limitations on the described embodiments. The embodiments may thus be described with different nomenclature and/or terminology utilized to describe the components, devices, parameters, methods and/ or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
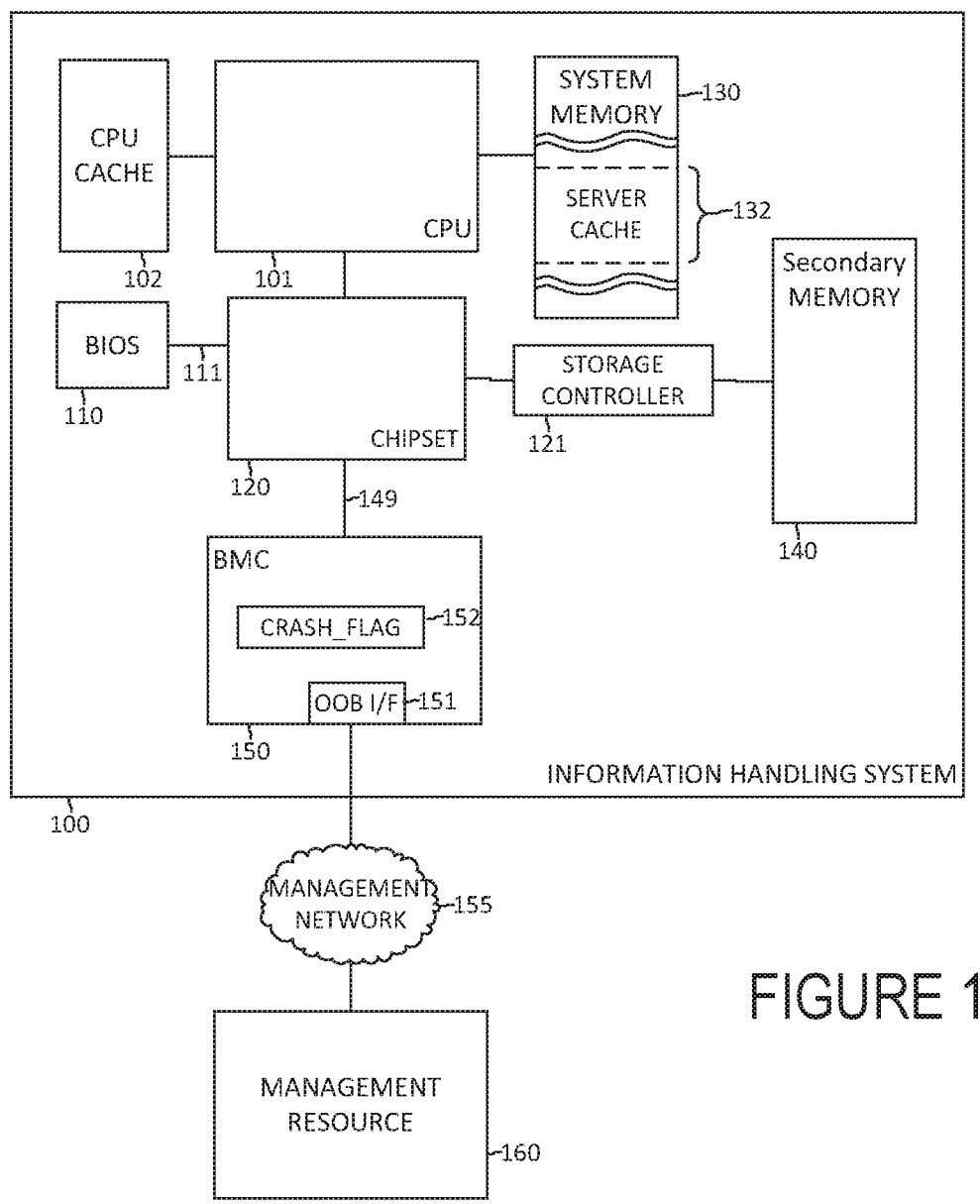
FIG. 1 illustrates an information handling system in accordance with disclosed subject matter.

Referring to the drawings, FIG. 1 illustrates an information handling system 100 configured to capture server cache content following a system crash. The information handling system 100 illustrated in FIG. 1 includes a central processing unit (CPU) 101, a chipset 120 coupled to CPU 101, and a baseboard management controller resource (BMC) 150 coupled to chipset 120.

The CPU 101 illustrated in FIG. 1 is coupled to a system memory 130 through a memory controller (not depicted) integrated within CPU 101. In other embodiments, the memory controller may be integrated within chipset 120 or provided within a second chipset device not shown in FIG. 1.

Chipset 120 provides various interfaces that support communication between various peripheral devices and CPU 101. The chip set 120 illustrated in FIG. 1 provides an interface 111, e.g., a low pin count (LPC) interface, to a BIOS flash 110, a storage interface 119, e.g., a peripheral component interconnect express (PCIe) interface, a serial ATA (SATA) interface, a serial attached SCSI (SAS) interface, or a fibre channel (FB) interface, to a storage controller 121 coupled to a secondary memory 140, and a serial interface 149, e.g., a universal serial bus (USB) interface, to BMC 150.

System memory 130 may include a suitable form of DRAM implemented with dual in-line memory modules (DIMMs) or NVDIMMs. Secondary memory 140 may comprise a suitable form of non-volatile memory including as examples, an SSD, or HDD storage. If system memory 130 is implemented with NVDIMMs, the secondary memory 140 may comprise the non-volatile storage portions of the NVDIMMs.

Of particular note with respect disclosed subject matter, all or some portion of system memory 130 is referred to as server cache 132. Server cache 132 represents a portion of system memory 130 that is preserved when a system crash occurs so that, when the system is reset following the crash, the contents of server cache 132 at the time the crash occurred can be accessed and analyzed. Server cache 132 is distinguished from the CPU cache 102 coupled to CPU 101. CPU cache 102 represents a memory resource that is hidden from the operating system and application software and that contains a subset of the main memory represented by system memory 130. The CPU cache 102 illustrated in FIG. 1 may be a level 2 (L2) or level 3 (L3) cache that is external to CPU 101. CPU cache 102 may support and/or comply with any of various suitable coherency protocols, such as a modified, exclusive, shared, invalid (MESI) protocol or a variation thereof, as well as any suitable write policy, and any suitable cache architecture.

FIG. 1 further illustrates a basic input/output system (BIOS) storage device, also referred to as BIOS flash 110 coupled to a low bandwidth interface, e.g., an LPC interface of chipset 120, that includes processor-executable BIOS instructions suitable for transitioning information handling system 100 to a known initial state following a hardware reset and/or power cycle. BIOS instructions may include software instruction for discovering and configuring hardware resources of information handling system 100 and for loading an operating system and exposing the hardware resources to the operating system.

BIOS instructions may encompass any instructions to be executed by CPU 101 when information handling system 100 is booted and/or powered on. In some embodiments, BIOS instructions may be boot firmware and may be configured to be the first code executed by CPU 101 when information handling system 100 is booted and/or powered on. The initial function of BIOS instructions may be to identify, test, and initialize components of information handling system 100 (e.g., graphics controllers, storage resources, and other hardware). As part of such initialization, BIOS instructions may be configured to set components of information handling system 100 into a known state, so that software (e.g., an operating system) stored on compatible computer-readable media can be loaded into memory accessible to CPU 101, executed by CPU 101, and given control of information handling system 100. In some embodiments, instructions stored in BIOS flash may comprise a Unified Extensible Firmware Interface (UEFI).

BMC 150 may perform functions related to management of information system 100 and may communicate with a remotely located management resource 160. BMC 150 may support functions analogous to functions performed by service processors, management controllers, remote access controllers (RACs), and the like. The BMC 150 illustrated in FIG. 1 includes a dedicated network interface 151 coupling BMC 150 to a remotely located management resource 160 via a dedicated management network 155. Because dedicated network interface 151 enables communication between information handling system 100 and management resource 160 via a network communication that is out-of-band with respect to the operations of CPU 101, network interface 151 may be referred to as out-of-band (OOB) interface 151.

In at least one embodiment, the BMC 150 maintains a persistent flag or attribute, referred to herein as a Crash_Flag 152 that indicates whether the most recent system reset occurred following a regular shut down. The BIOS 110 may be configured to establish communication with BMC 150, even before an operating system (OS) is installed, and to obtain the value of Crash_Flag 152 during system boot. In at least one embodiment, BIOS 110 performs a pre-OS query of BMC 150 to obtain the value of Crash_Flag 152. If the value of Crash_Flag 152 indicates that information handling system 100 is re-setting following a crash, the system may be configured to perform particular operations referred to herein as crash dump operations.

In at least one embodiment, the crash dump operations include copying the contents of server cache 132 to secondary memory 140. In such embodiments, BIOS 110, or a suitable BIOS extension, may load a driver for secondary memory 140 prior to copying the contents of server cache 132 to secondary memory 140. The administrator or other user may be notified of the system crash and may be prompted to indicate whether to proceed with OS loading or perform Server Diagnostics.

Following successful crash dump operations, secondary memory 140 includes a snapshot of server cache 132 at the time the system crash occurred. BIOS 110 may be configured to send this data, referred to herein as, crash data, to BMC 150, which may include its own resident persistent storage resources. The BMC 150 may also forward the crash data to a flash drive via a USB port of the BMC and/or forward the crash data to management resource 160 via the OOB interface for additional analysis.

Figure 2:
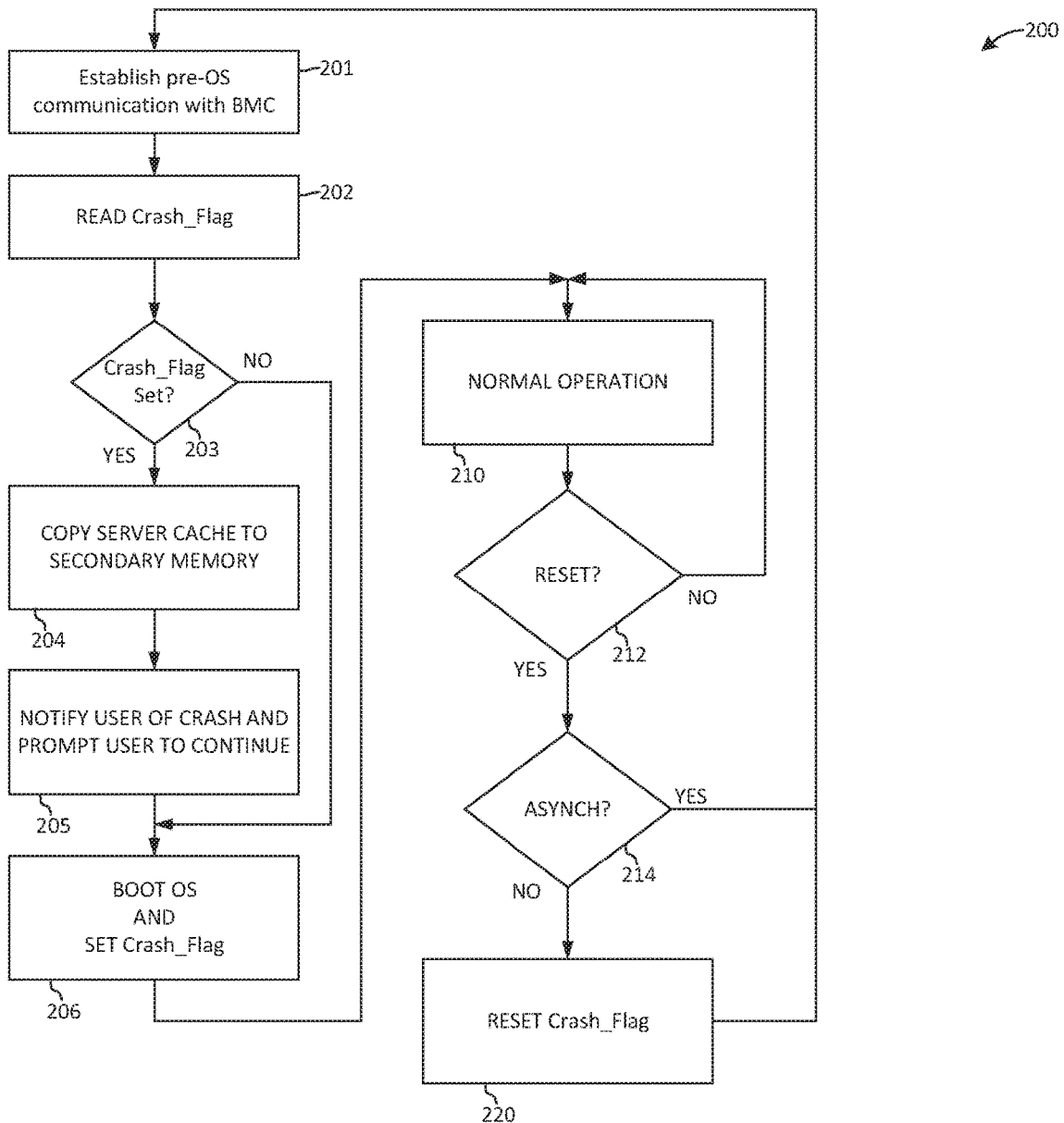
FIG. 2 illustrates a flow diagram of a method of capture cache content following an asynchronous system reset.

Referring now to FIG. 2 a flow diagram illustrates a method 200 of saving server cache contents following an asynchronous system reset which might include, as an example, a system reset initiated by a watchdog timer resulting from a hardware lockup or some event that resulted in a "hanged" system. Accordingly, the method 200 illustrated in FIG. 2 may execute in response to a system reset.

Following a system reset, BIOS executes establishes (block 201) pre-OS communication with the BMC and reads or otherwise determines (block 202) the state or value of the Crash_Flag stored on the BMC. If (block 203) the Crash_Flag is in a SET state, e.g., to indicate that the system is booting following an asynchronous reset, BIOS perform crash dump operations including copying(block 204) the server cache contents to a secondary memory device. The secondary memory may be any of various non-volatile storage resources. Secondary memory may include, as examples, an NVDIMM, a solid state drive (SSD), a hard disk drive (HDD), a flash memory or the like. Once the server cache contents are captured in the secondary memory, the boot sequence may continue. As illustrated in FIG. 2, following the copying of the server cache to secondary memory, an administrator or other user may be notified (block 205) and prompted on whether to continue with the boot sequence. Assuming the administrator elects to continue with the boot sequence, the operating system is booted (block 206), the Crash_Flag is SET, and normal operation (block 210) begins.

Normal operation (block 210) continues until, eventually, a system reset occurs (block 212). Upon detecting a system reset, the method 200 illustrated in FIG. 2 determines (block 214) whether the reset is asynchronous or synchronous, where asynchronous resets are associated with unexpected or abnormal system behavior whereas a synchronous reset is associated with a controlled shutdown procedure initiated by a user or a management input.

If the reset is determined to be a synchronous reset, the crash flag is RESET (block 220) before the boot sequence is again initiated at block 201. If the reset at block 214 is asynchronous, method 200 may simply jump back to block 201 because the Crash_Flag is already in the state indicative of the reset, i.e., the Crash_Flag is already in the SET state from the operation at block 206 before normal operation began.

Any one or more processes or methods described above, including processes and methods associated with the FIG. 2 flow diagram, may be embodied as a computer readable storage medium or, more simply, a computer readable medium including processor-executable program instructions, also referred to as program code or software, that, when executed by the processor, cause the processor to perform or otherwise results in the performance of the applicable operations.

A computer readable medium, which may also be referred to as computer readable memory or computer readable storage, encompasses volatile and non-volatile medium, memory, and storage, whether programmable or not, whether randomly accessible or not, and whether implemented in a semiconductor, ferro-magnetic, optical, organic, or other suitable medium. Information handling systems may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, F/W, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicates the presence of stated features, operations, elements, and/or components, but does not preclude the presence or addition of one or more other features, operations, elements, components, and/or groups thereof.

What is claimed is:

1. A method of operating an information handling system, the method comprising:
   initiating a boot sequence following a system reset, wherein the boot sequence includes:
   establishing pre-operating system (pre-OS) communication with a management controller of the information handling system;
   determining a pre-OS state of a crash flag of the management controller wherein the pre-OS state is either a CLEAR state or a SET state, wherein the CLEAR state indicates that the system reset was a synchronous reset, comprising a reset associated with a controlled procedure to restart an operating system of the information handling system;
   responsive to determining that the pre-OS state of the crash flag is the SET state, performing crash dump operations, wherein the crash dump operations include:
   saving a crash snapshot, comprising at least a portion of system memory contents, to a persistent secondary memory; and
   booting to the operating system without modifying the state of the crash flag;
   responsive to determining that the pre-OS state of the crash flag is the CLEAR state, changing the state of the crash flag to the SET state and booting to the operating system; and
   responsive to detecting a subsequent system reset after booting to the operating system, setting the state of the crash flag to the CLEAR state only if the subsequent system reset is a synchronous reset.

2. The method of claim 1, wherein the boot sequence includes basic input/output system (BIOS) operations corresponding to instructions stored in a BIOS storage device and wherein detecting the state of the crash flag comprises a BIOS operation.

3. The method of claim 1, wherein the persistent secondary memory comprises a persistent storage selected from: a solid state drive (SSD), a non-volatile dual in-line memory module (NVDIMM), and a hard disk drive (HDD).

4. The method of claim 3, further comprising:
   copying the crash snapshot to the management controller.

5. The method of claim 4, further comprising:
   storing, by the management controller, the crash snapshot to a portable flash memory device via a universal serial bus.

6. The method of claim 4, further comprising:
   forwarding, by the management controller, the crash snapshot to a remotely located management resource via an out of band interface coupled to a management network.

7. The method of claim 1, wherein the crash snapshot includes a crash timestamp indicative of when the system reset occurred.

8. An information handling system comprising:
   a central processing unit;
   a BIOS storage device including BIOS instructions;
   a baseboard management controller (BMC);
   a computer readable medium including processor executable instruction's that, when executed, cause the information handling system to perform operations comprising:
   initiating a boot sequence following a system reset, wherein the boot sequence includes:
   establishing pre-operating system (pre-OS) communication with a management controller of the information handling system;
   determining a pre-OS state of a crash flag of the management controller wherein the pre-OS state is either a CLEAR state or a SET state, wherein the CLEAR state indicates that the system reset was a synchronous reset, comprising a reset associated with a controlled procedure to restart an operating system of the information handling system;
   responsive to determining that the pre-OS state of the crash flag is the SET state, performing crash dump operations, wherein the crash dump operations include:
   saving a crash snapshot, comprising at least a portion of system memory contents, to a persistent secondary memory; and
   booting to the operating system without modifying the state of the crash flag;
   responsive to determining that the pre-OS state of the crash flag is the CLEAR state, changing the state of the crash flag to the SET state and booting to the operating system; and
   responsive to detecting a subsequent system reset after booting to the operating system, setting the state of the crash flag to the CLEAR state only if the subsequent system reset is a synchronous reset.

9. The information handling system of claim 8, wherein the boot sequence includes BIOS operations corresponding to the BIOS instructions and wherein the BIOS operations include detecting the state of the crash flag.

10. The information handling system of claim 8, wherein the persistent secondary memory comprises a solid state drive (SSD).

11. The information handling system of claim 8, further comprising:
    copying the crash snapshot to the BMC.

12. The information handling system of claim 11, further comprising:
    storing, by the BMC, the crash snapshot to a portable flash memory device via a universal serial bus.

13. The information handling system of claim 11, further comprising:
    forwarding, by the BMC, the crash snapshot to a remotely located management resource via an out of band interface coupled to a management network.

14. The information handling system of claim 8, wherein the crash snapshot includes a crash timestamp indicative of when the system reset occurred.

15. The information handling system of claim 8, wherein the persistent secondary memory comprises a non-volatile dual in-line memory module (NVDIMM).

16. The information handling system of claim 15, wherein saving the crash snapshot includes configuring the NVDIMM in an asynchronous DRAM save (ADR) state and asserting an NVDIMM save signal provided to a save pin of the NVDIMM.

17. The information handling system of claim 8, wherein the persistent secondary memory comprises hard disk drive (HDD) storage.

18. The information handling system of claim 8, wherein the system reset comprises a system reset initiated by a watchdog timer.

19. The information handling system of claim 18, wherein the controlled shutdown comprises a controlled shutdown initiated by a user input.

* * * * *